United States Patent
Urababa et al.

(10) Patent No.: US 7,725,226 B2
(45) Date of Patent: May 25, 2010

(54) VEHICLE SUSPENSION SYSTEM WITH ROLL STIFFNESS DISTRIBUTION CONTROL

(75) Inventors: Shingo Urababa, Toyota (JP); Tomoyuki Iida, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 582 days.

(21) Appl. No.: 11/350,727

(22) Filed: Feb. 10, 2006

(65) Prior Publication Data
US 2006/0212199 A1 Sep. 21, 2006

(30) Foreign Application Priority Data
Mar. 16, 2005 (JP) ............................. 2005-075701

(51) Int. Cl.
*B60G 17/016* (2006.01)
(52) U.S. Cl. ..................................... 701/38; 280/5.506
(58) Field of Classification Search .................... 701/38
See application file for complete search history.

(56) References Cited

U.S. PATENT DOCUMENTS

| | | | |
|---|---|---|---|
| 5,032,997 A | | 7/1991 | Kawagoe |
| 5,948,027 A | | 9/1999 | Oliver, Jr. et al. |
| 6,088,637 A | | 7/2000 | Acker et al. |
| 6,092,815 A | | 7/2000 | Rutz et al. |
| 6,405,585 B1 | * | 6/2002 | Hewitt ..................... 73/116.05 |
| 6,425,585 B1 | | 7/2002 | Schuelke et al. |
| 2002/0013645 A1 | | 1/2002 | Badenoch |
| 2005/0023789 A1 | | 2/2005 | Suzuki et al. |
| 2005/0077696 A1 | | 4/2005 | Ogawa |

FOREIGN PATENT DOCUMENTS

| | | |
|---|---|---|
| DE | 198 46 275 A1 | 12/1999 |
| EP | 0 339 617 A2 | 11/1989 |
| EP | 0 827 852 A2 | 3/1998 |

(Continued)

OTHER PUBLICATIONS

Sep. 1, 2009 Office Action (Drafted Aug. 26, 2009) issued in Japanese Patent Application No. 2005-075701 with translation.

(Continued)

*Primary Examiner*—Thomas G Black
*Assistant Examiner*—Shelley Chen
(74) *Attorney, Agent, or Firm*—Oliff & Berridge, PLC

(57) ABSTRACT

In a target rotational angle determining routine, based on a roll moment and longitudinal acceleration that are calculated, target rotational angles of actuators on a subject side (one of front-wheel and rear-wheel sides) and a counterpart side are obtained using a common map. An actual rotational angle on the counterpart side is read. It is determined whether the absolute value of a difference obtained by subtracting the actual rotational angle supplied from the counterpart side from the target rotational angle on the counterpart side that is obtained by the subject side is equal to or greater than a set angle difference $\Delta\theta_0$. If YES, it is determined that roll stiffness on the counterpart side is insufficient, and the target rotational angle on the subject side is changed so that a roll stiffness distribution ratio between the front-wheel side and the rear-wheel side comes close to a set distribution ratio.

15 Claims, 10 Drawing Sheets

FOREIGN PATENT DOCUMENTS

| | | |
|---|---|---|
| EP | 1 473 178 A1 | 11/2004 |
| EP | 1473178 * | 11/2004 |
| EP | 1 491 371 A1 | 12/2004 |
| EP | 1491371 * | 12/2004 |
| JP | A 63-145118 | 6/1988 |
| JP | A 03-164316 | 7/1991 |
| JP | A 03-197226 | 8/1991 |
| JP | A 04-260807 | 9/1992 |
| JP | A 5-319055 | 12/1993 |
| JP | A 06-211018 | 8/1994 |
| JP | A 7-32845 | 2/1995 |
| JP | A-7-186674 | 7/1995 |
| JP | A 7-186674 | 7/1995 |
| JP | A 2000-071737 | 3/2000 |
| JP | A-2003-226127 | 8/2003 |
| JP | A 2005-047433 | 2/2005 |

OTHER PUBLICATIONS

Feb. 1, 2008 Office Action issued in Chinese Patent Application No. 200610057019.5 with translation.

May 7, 2007 Office Action issued in Korean Patent Application No. 2006-21776 with translation.

Oct. 14, 2008 Notice of Grant issued in Chinese Patent Application No. 2006100570195 with translation.

Nov. 27, 2007 Notice of Allowance issued in Korean Patent Application No. 2006-21776 with translation.

Dec. 17, 2007 Office Action issued in European Patent Application No. 06 003 842.9-2421.

\* cited by examiner

VEHICLE SUSPENSION SYSTEM WITH ROLL STIFFNESS DISTRIBUTION CONTROL

INCORPORATION BY REFERENCE

The disclosure of Japanese Patent Application No. 2005-75701 filed on Mar. 16, 2005, including the specification, drawings and abstract, is incorporated herein by reference in its entirety.

BACKGROUND OF THE INVENTION

1. Field of the Invention

The invention relates to a suspension system of a vehicle, and more particularly to a suspension system which can control roll stiffness distribution between a front-wheel side and a rear-wheel side.

2. Description of Related Art

Each of Japanese Patent Application Publications No. JP-A-7-186674, No. JP-A-7-32845, and No. JP-A-5-319055 describes a suspension system which can control roll stiffness distribution. For example, the suspension system described in Japanese Patent Application Publication No. JP-A-7-186674 includes a front roll stiffness changing device; a rear roll stiffness changing device; a roll moment distribution estimating device; and a roll stiffness distribution control device. The front roll stiffness changing device changes roll stiffness on the front-wheel side of a vehicle. The rear roll stiffness changing device changes roll stiffness on the rear-wheel side. The roll moment distribution estimating device estimates distribution of a roll moment that is caused in the vehicle between the front-wheel side and the rear-wheel side of the vehicle. The roll stiffness distribution control device controls the front roll stiffness changing device and the rear roll stiffness changing device so as to distribute roll stiffness between the front-wheel side and the rear-wheel side according to the result of estimation made by the roll moment distribution estimating device.

In such a suspension system that can control roll stiffness distribution, if both of actuators of the front roll stiffness changing device and the rear roll stiffness changing device have sufficient driving performance, the roll stiffness distribution of the vehicle can be controlled as intended.

However, at least one of the actuators of the front roll stiffness changing device and the rear roll stiffness changing device may not have sufficient driving performance. For example, there may be the case where size of at least one of the actuators cannot be increased taking into account an installation space, a permissible weight, and the like. Also, there may be the case where the front roll stiffness changing device and rear roll stiffness changing device are the same, and therefore the driving performance of one of the actuators becomes insufficient. Also, the operation amount of the roll stiffness changing device may become insufficient due to insufficient response of the actuator.

For example, when the roll stiff changing device includes a stabilizer bar and an actuator that actively changes the torsion angle thereof, the stabilizer bar may be twisted by a roll moment before the stabilizer bar is twisted by an appropriate angle by the actuator, and the actuator may not be operated because great resistance torque has already been generated. If the speed at which the roll moment increases is low, the actuator can be operated by a predetermined operation amount. However, if the speed at which the roll moment increases is high, the actuator cannot be operated by the predetermined operation amount.

If the operation amount of the front roll stiffness changing device is insufficient, the roll stiffness on the rear-wheel side increases, and the vehicle steer characteristic shifts from a standard steer characteristic, which is a designed steer characteristic, to an oversteer characteristic (the standard steer characteristic is not necessarily a neutral steer characteristic). If the operation amount of the rear roll stiffness changing device is insufficient, the roll stiffness on the front-wheel side increases, and the vehicle steer characteristic shifts to an understeer characteristic.

SUMMARY OF THE INVENTION

It is an object of the invention to provide a suspension system which can prevent or suppress an undesirable change in a steer characteristic due to insufficient driving performance of an actuator.

A first aspect of the invention relates to a suspension system that includes (a) a front roll stiffness changing device that changes roll stiffness on a front-wheel side of a vehicle; (b) a rear roll stiffness changing device that changes roll stiffness on a rear-wheel side of the vehicle; and (c) a roll stiffness distribution control device that controls roll stiffness distribution between the front-wheel side and the rear-wheel side by controlling the front roll stiffness changing device and the rear roll stiffness changing device. The roll stiffness distribution control device includes a dependent target roll stiffness determining portion that determines a target roll stiffness correspondence amount of at least one of the front roll stiffness changing device and the rear roll stiffness changing device, according to an actual roll stiffness correspondence amount of a counterpart of the at least one of the front roll stiffness changing device and the rear roll stiffness changing device. The target roll stiffness correspondence amount is a target value for controlling a roll stiffness correspondence amount that corresponds one-to-one with the roll stiffness.

The roll stiffness correspondence amount includes the roll stiffness itself, the operation amount of an actuator or a driving source for the actuator, a difference between loads on the left and right wheels, the amount of electric power supplied to an electric motor that is a driving source, and a hydraulic pressure supplied to a hydraulic actuator that is a driving source. However, the actual roll stiffness correspondence amount does not include the amount of electric power supplied to the electric motor, the hydraulic pressure supplied to the hydraulic actuator, and the like, which do not necessarily correspond to the actual roll stiffness. Further, the roll stiffness correspondence amount is expressed as a positive value in both of the case where the vehicle turns to the right and the case where the vehicle turns to the left. If the roll stiffness correspondence amount is expressed as one of the positive value and the negative value in the case where the vehicle turns to the right, and the roll stiffness correspondence amount is expressed as the other of the positive value and the negative value in the case where the vehicle turns to the left, it is convenient to use the absolute value of the roll stiffness correspondence amount.

The invention includes at least one of the following aspects as shown in embodiments described later. In an aspect, if the driving performance of any one of the actuators on the front-wheel side and on the rear-wheel side is insufficient, the target roll stiffness correspondence amount on the side where the driving performance of the actuator is sufficient is determined according to the actual roll stiffness correspondence amount on the side where the driving performance of the actuator is insufficient. In another aspect, only the driving performance of the actuator on the front-wheel side may become insufficient and the driving performance of the actuator on the rear-wheel side is always sufficient. Therefore, the target roll stiffness correspondence amount on the rear-wheel side is always determined according to the actual roll stiffness correspondence amount on the front-wheel side when the driving performance of the actuator becomes insufficient. In yet another aspect, only the driving performance of the actuator on the rear-wheel side may become insufficient and the driving performance of the actuator on the front-wheel side is always sufficient. Therefore, the target roll stiffness correspondence amount on the front-wheel side is always determined according to the actual roll stiffness correspondence amount on the rear-wheel side when the driving performance of the actuator becomes insufficient.

In the suspension system according to the first aspect of the invention, for example, when the driving performance of the actuator of the front roll stiffness changing device is insufficient, and therefore the roll stiffness on the front-wheel side is insufficient, the target roll stiffness correspondence amount on the rear-wheel side is determined according to the actual roll stiffness correspondence amount on the front-wheel side. Alternatively, when the driving performance of the actuator of the rear roll stiffness changing device is insufficient, and therefore the roll stiffness on the rear-wheel side is insufficient, the target roll stiffness correspondence amount on the front-wheel side is determined according to the actual roll stiffness correspondence amount on the rear-wheel side. That is, the target roll stiffness correspondence amount on the front-wheel side or the rear-wheel side where the driving performance of the actuator is sufficient is reduced. As a result, the roll stiffness distribution ratio between the front-wheel side and the rear-wheel side becomes an appropriate value, or comes close to an appropriate value. This prevents or suppresses an undesirable change in the steer characteristic.

Hereinafter, aspects of the invention will be described. The aspects will be classified into sections, and a number is assigned to each of the sections. Descriptions will be made by citing a number of another section if necessary. The descriptions will be made in this manner in order to facilitate understanding of some or a combination of technical features according to the invention. Therefore, it should not be interpreted that the technical features or combinations thereof according to the invention are limited to the following aspects. Accordingly, an aspect where another component is added to each of the aspects in the sections, or an aspect where at least one component is removed from each of the aspects in the sections can be an aspect of the invention.

(1) An aspect of the invention relates to a suspension system that includes a front roll stiffness changing device that changes roll stiffness on a front-wheel side of a vehicle; a rear roll stiffness changing device that changes roll stiffness on a rear-wheel side of the vehicle; and a roll stiffness distribution control device that controls roll stiffness distribution between the front-wheel side and the rear-wheel side by controlling the front roll stiffness changing device and the rear roll stiffness changing device. The roll stiffness distribution control device includes a dependent target roll stiffness determining portion that determines a target roll stiffness correspondence amount of at least one of the front roll stiffness changing device and the rear roll stiffness changing device, according to an actual roll stiffness correspondence amount of a counterpart of the at least one of the front roll stiffness changing device and the rear roll stiffness changing device. The target roll stiffness correspondence amount is a target value for controlling a roll stiffness correspondence amount that corresponds one-to-one with the roll stiffness.

(2) In the suspension system described in a section (1), the dependent target roll stiffness determining portion includes a set distribution ratio correspondence determining portion that determines the target roll stiffness correspondence amount of at least one of the front roll stiffness changing device and the rear roll stiffness changing device so that a target/actual roll stiffness distribution ratio becomes equal to a set distribution ratio. The target/actual roll stiffness distribution ratio is a ratio of the target roll stiffness correspondence amount of the at least one of the front roll stiffness changing device and the rear roll stiffness changing device to the actual roll stiffness correspondence amount of a counterpart of the at least one of the front roll stiffness changing device and the rear roll stiffness changing device.

In the suspension system that includes the set distribution ratio correspondence portion, if the driving performance of the actuator of at least one of the front roll stiffness changing device and the rear roll stiffness changing device is insufficient, a designed standard distribution ratio is achieved.

(3) In the suspension system described in the section (1) or (2), the roll stiffness distribution control device includes an independent front target roll stiffness determining portion and an independent rear target roll stiffness determining portion. The independent front target roll stiffness determining portion determines a front target roll stiffness correspondence amount that is the target roll stiffness correspondence amount of the front roll stiffness changing device independently of the independent rear target roll stiffness determining portion, and the independent rear target roll stiffness determining portion determines a rear target roll stiffness correspondence amount that is the target roll stiffness correspondence amount of the rear roll stiffness changing device, independently of the independent front target roll stiffness determining portion.

(4) In the suspension system described in the section (3), the roll stiffness distribution control device includes a roll stiffness determining portion selection portion. The roll stiffness determining portion selection portion ordinarily selects the independent front target roll stiffness determining portion and the independent rear target roll stiffness determining portion; and selects the dependent target roll stiffness determining portion if an actual roll stiffness distribution ratio between the front-wheel side and the rear-wheel differs from a set roll stiffness distribution ratio by a set amount or greater as a result of executing a roll stiffness control based on the front target roll stiffness correspondence amount determined by the independent front target roll stiffness determining portion and the rear target roll stiffness correspondence amount determined by the independent rear target roll stiffness determining portion.

In the suspension system in this section, if a roll moment itself is small or a speed at which the roll moment increases is low, a designed roll angle control is executed and a designed roll stiffness distribution ratio is achieved. If the roll moment is large or a speed at which the roll moment increases is high, the designed roll stiffness distribution ratio is achieved or the actual roll stiffness distribution ratio comes close to the standard roll stiffness distribution ratio, while sacrificing the roll angle control.

(5) The suspension system described in the section (4) further includes a front actual roll stiffness correspondence amount obtaining device, and a rear actual roll stiffness correspondence amount obtaining device. In the suspension system, the roll stiffness determining portion selection portion includes a rear selection portion and a front selection portion. The front actual roll stiffness correspondence amount obtaining device obtains a front actual roll stiffness correspondence amount that is an actual roll stiffness correspondence amount on the front-wheel side. The rear actual roll stiffness correspondence amount obtaining device obtains a rear actual roll stiffness correspondence amount that is an actual roll stiffness correspondence amount on the rear-wheel side. The rear selection portion selects the dependent target roll stiffness determining portion that determines the target roll stiffness correspondence amount of the rear roll stiffness changing device according to the front actual roll stiffness correspondence amount obtained by the front actual roll stiffness correspondence amount obtaining device if the front actual roll stiffness correspondence amount differs from the front target roll stiffness correspondence amount determined by the independent front target roll stiffness determining portion by a set amount or greater. The front selection portion selects the dependent target roll stiffness determining portion that determines the target roll stiffness correspondence amount of the front roll stiffness changing device according to the rear actual roll stiffness correspondence amount obtained by the rear actual roll stiffness correspondence amount obtaining device if the rear actual roll stiffness correspondence amount differs from the rear target roll stiffness correspondence amount determined by the independent rear target roll stiffness determining portion by a set amount or greater.

The roll stiffness determining portion selection portion in this section determines that the actual roll stiffness distribution ratio between the front-wheel side and the rear-wheel side differs from the set roll stiffness distribution ratio by a set amount or greater, and selects the dependent target roll stiffness determining portion if the front actual roll stiffness correspondence amount differs from the front target roll stiffness correspondence amount by a set amount or greater, or if the rear actual roll stiffness correspondence amount differs from the rear target roll stiffness correspondence amount by a set amount or greater. For example, if a difference obtained by subtracting the actual roll stiffness correspondence amount from the target roll stiffness correspondence amount is equal to or greater than the set value, or if a value obtained by dividing the actual roll stiffness correspondence amount by the target roll stiffness correspondence amount is equal to or less than the set value, it is considered that the actual roll stiffness correspondence amount differs from the target roll stiffness correspondence amount by a set amount or greater.

The roll stiffness distribution control device that includes the aforementioned roll stiffness determining portion selection portion is suitable particularly for a suspension system where the driving performance of the actuators on both of the front-wheel side and the rear-wheel side may become insufficient. However, the roll stiffness distribution control device may be used in a suspension system where only the driving performance of the actuator on the front-wheel side may become insufficient and the driving performance of the actuator on the rear-wheel side is always sufficient, and a suspension system where only the driving performance of the actuator on the rear-wheel side may become insufficient and the driving performance of the actuator on the front-wheel side is always sufficient.

(6) The suspension system described in the section (4) further includes a front actual roll stiffness correspondence amount obtaining device, and a rear actual roll stiffness correspondence amount obtaining device. In the suspension system, the roll stiffness determining portion selection portion includes an actual roll stiffness distribution ratio obtaining portion, and an actual roll stiffness distribution ratio base selection portion. The front actual roll stiffness correspondence amount obtaining device obtains a front actual roll stiffness correspondence amount that is an actual roll stiffness correspondence amount on the front-wheel side. The rear actual roll stiffness correspondence amount obtaining device obtains a rear actual roll stiffness correspondence amount that is an actual roll stiffness correspondence amount on the rear-wheel side. The actual roll stiffness distribution ratio obtaining portion obtains an actual roll stiffness distribution ratio that is an actual roll stiffness distribution ratio between the front-wheel side and the rear-wheel side, based on the front actual roll stiffness correspondence amount obtained by the front actual roll stiffness correspondence amount obtaining device and the rear actual roll stiffness correspondence amount obtained by the rear actual roll stiffness correspondence amount obtaining device. The actual roll stiffness distribution ratio base selection portion selects the dependent target roll stiffness determining portion based on the actual roll stiffness distribution ratio obtained by the actual roll stiffness distribution ratio obtaining portion.

The actual roll stiffness correspondence amounts on both of the front-wheel side and the rear-wheel side are obtained, and the actual roll stiffness distribution ratio is obtained based on the actual roll stiffness correspondence amounts if the actual roll stiffness distribution ratio indicates that the roll stiffness on the front-wheel side is insufficient, the dependent target roll stiffness determining portion is selected for the rear-wheel side. If the actual roll stiffness distribution ratio indicates that the roll stiffness on the rear-wheel side is insufficient, the dependent target roll stiffness determining portion is selected for the front-wheel side.

(7) In the suspension system described in the section (5) or (6), at least one of the front actual roll stiffness correspondence amount obtaining device and the rear actual roll stiffness correspondence amount obtaining device includes an actuator operation amount detecting device. The actuator operation amount detecting device obtains, as at least one of the front actual roll stiffness correspondence amount and the rear actual roll stiffness correspondence amount, an operation amount of the actuator of at least one of the front roll stiffness changing device and the rear roll stiffness changing device, which corresponds to the at least one of the front actual roll stiffness correspondence amount obtaining device and the rear actual roll stiffness correspondence amount obtaining device.

The operation amount of the actuator corresponds one-to-one with the actual roll stiffness (for example, the operation amount of the actuator is proportional to the actual roll stiffness). Therefore, it is appropriate to use the operation amount of the actuator as the actual roll stiffness correspondence amount. Further, an actuator operation amount obtaining portion is usually provided for controlling the actuator. By providing the actuator operation amount obtaining portion, the need for providing a dedicated device for obtaining the actual roll stiffness correspondence amount is eliminated, which makes it possible to achieve the object at low cost.

(8) In the suspension system described in any one of the sections (5) to (7), at least one of the front actual roll stiffness correspondence amount obtaining device and the rear actual roll stiffness correspondence amount obtaining device includes a left-wheel load sensor and a right-wheel load sensor; and a wheel load difference obtaining portion. The left-wheel load sensor and the right-wheel load sensor detect loads on a left wheel and a right wheel, respectively, on at least one of a front side and a rear side that corresponds to the at least one of the front actual roll stiffness correspondence amount obtaining device and the rear actual roll stiffness correspondence amount obtaining device. The wheel load difference obtaining portion obtains, as at least one of the front actual roll stiffness correspondence amount and the rear actual roll stiffness correspondence amount, a difference between the loads on the left-wheel and the right-wheel which are detected by the left-wheel load sensor and the right-wheel load sensor.

The difference between the loads on the left-wheel and the right-wheel corresponds one-to-one with the actual roll stiffness (for example, the difference is proportional to the actual roll stiffness). Therefore, it is appropriate to use the difference between the loads on the left-wheel and the right-wheel, as the actual roll stiffness correspondence amount. The left-wheel load sensor and the right-wheel sensor may be provided in tires or the like, and may detect the loads on the left-wheel and the right-wheel, respectively. Alternatively, for example, each of the left-wheel load sensor and the right-wheel sensor may detect the load on each of the left wheel and the right wheel based on an amount that corresponds one-to-one with a stress generated in a suspension link, a hydraulic pressure in a suspension cylinder for each wheel, an air pressure of an air spring, an elastic force of a suspension spring, or the like.

(9) In the suspension system described in a section (1), the roll stiffness distribution control device includes an independent target roll stiffness determining portion and a dependent target roll stiffness determining portion. The independent target roll stiffness determining portion determines the target roll stiffness correspondence amount of a predetermined one of the front roll stiffness changing device and the rear roll stiffness changing device independently. The dependent target roll stiffness determining portion determines the target roll stiffness correspondence amount of a counterpart of the predetermined one of the front roll stiffness changing device and the rear roll stiffness changing device, according to the actual roll stiffness correspondence amount of the predetermined one of the front roll stiffness changing device and the rear roll stiffness changing device.

In the suspension system described in the section, the driving performance of the actuator of one of the front roll stiffness changing device and the rear roll stiffness changing device is always sufficient. That is, the target roll stiffness correspondence amount on the side where the driving performance of the actuator is sufficient is always determined according to the actual roll stiffness correspondence amount on the counterpart side.

(10) The suspension system described in the section (9) further includes an actual roll stiffness correspondence amount obtaining device that obtains the actual roll stiffness correspondence amount corresponding to the predetermined one of the front roll stiffness changing device and the rear roll stiffness changing device.

(11) In the suspension system described in the section (10), the actual roll stiffness correspondence amount obtaining device includes an actuator operation amount detecting device that obtains, as the actual roll stiffness correspondence amount, an operation amount of the actuator of the predetermined one of the front roll stiffness changing device and the rear roll stiffness changing device.

(12) In the suspension system described in the section (10) or (11), the actual roll stiffness correspondence amount obtaining device includes a left-wheel load sensor and a right-wheel load sensor; and a wheel load difference obtaining portion. The left-wheel load sensor and the right-wheel load sensor detect loads on a left wheel and a right wheel, respectively, on one of a front side and a rear side that corresponds to the predetermined one of the front actual roll stiffness correspondence amount obtaining device and the rear actual roll stiffness correspondence amount obtaining device. The wheel load difference obtaining portion obtains, as the actual roll stiffness correspondence amount, a difference between the loads on the left-wheel and the right-wheel which are detected by the left-wheel load sensor and the right-wheel load sensor.

(13) The suspension system described in any one of the sections (1) to (12) further includes a front control device that controls the front roll stiffness changing device, and a rear control device that controls the rear roll stiffness changing device. In the suspension system, the roll-stiffness distribution control device includes an actual roll stiffness correspondence amount supply portion. The actual roll stiffness correspondence amount supply portion is provided in at least one of the front control device and the rear control device, and supplies the actual roll stiffness correspondence amount that corresponds to a counterpart of the at least one of the front control device and the rear control device from the counterpart to the at least one of the front control device and the rear control device.

DETAILED DESCRIPTION OF THE EXAMPLE EMBODIMENTS

Hereinafter, embodiments of the invention will be described in detail with reference to the drawings. The invention can be realized also in other embodiments where various modifications are made based on the knowledge of persons skilled in the art.

Figure 1:
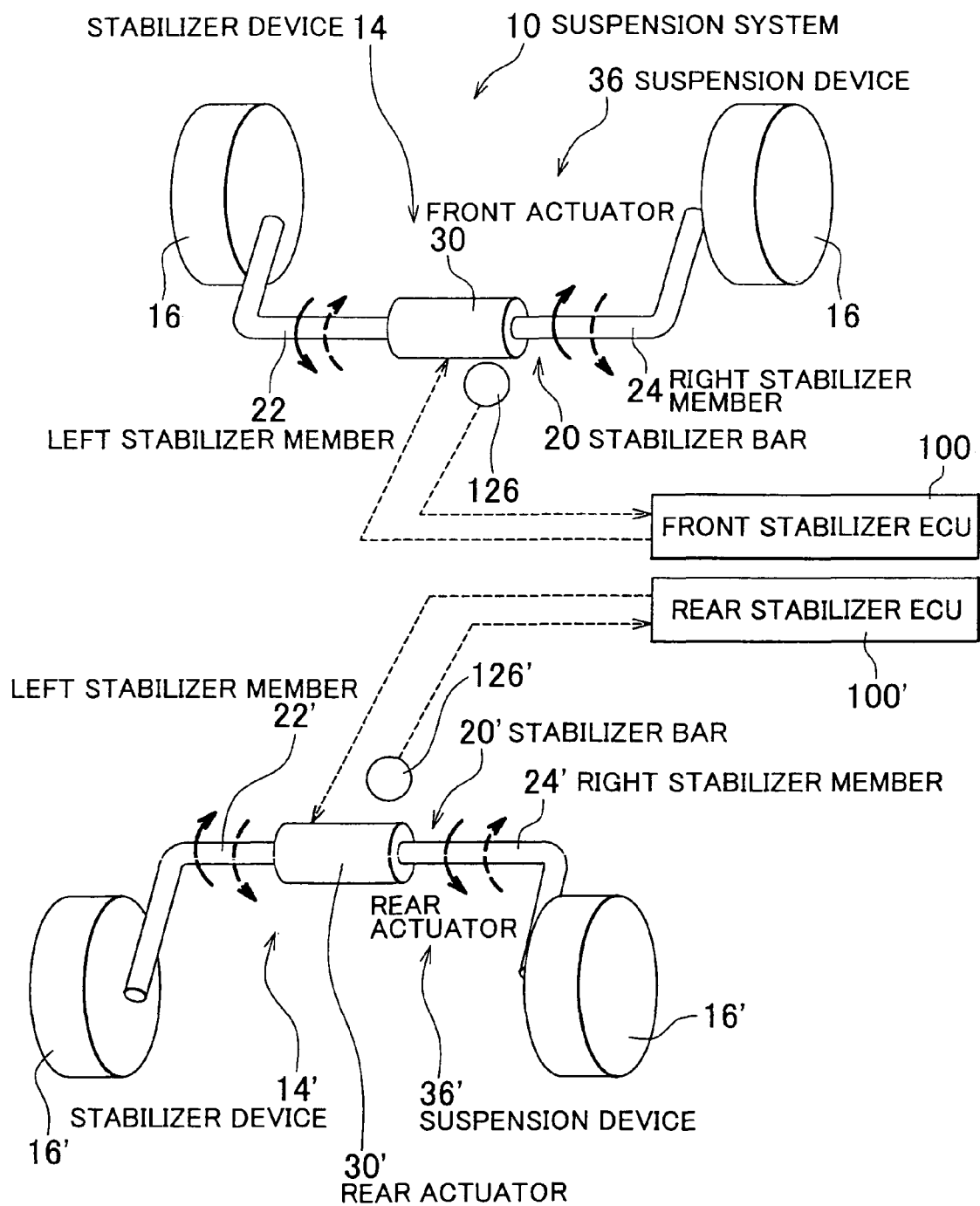
FIG. 1 illustrates a perspective view of a stabilizer device of a suspension system according to an embodiment of the invention.

FIG. 1 illustrates a diagram that conceptually shows a portion of a suspension system according to an embodiment of the invention. A suspension system 10 includes two stabilizer devices 14, 14' that suppress rolling of a vehicle (hereinafter, reference numerals indicating components on the rear-wheel side are apostrophized). The stabilizer devices 14, 14' are provided on the front-wheel side and on the rear-wheel side, respectively. The stabilizer devices 14, 14' include stabilizer bar 20, 20' respectively. The stabilizer bar 20 is connected, at both ends thereof, to wheel-holding members that hold front-left and front-right wheels 16; and the stabilizer bar 20' is connected, at both ends thereof, to wheel-holding members that hold rear-left and rear-right wheels 16' (refer to FIG. 2). Each of the stabilizer bars 20, 20' is divided into two parts at a center portion. Each of the stabilizer bars 20, 20' includes a pair of stabilizer members. That is, the stabilizer bar 20 includes a left stabilizer member 22 and a right stabilizer member 24. The stabilizer bar 20' includes a left stabilizer member 22' and a right stabilizer member 24'. The left stabilizer members 22, 22' are connected to the right stabilizer members 24, 24' via the actuators 30, 30'. The left stabilizer members 22, 22' can be rotated with respect to the right stabilizer members 24, 24'. The actuators 30, 30' rotate the left stabilizer members 22, 22' and the right stabilizer members 24, 24' with respect to each other (as shown by arrows in FIG. 1) so that the elastic forces of the stabilizer bars 20, 20' are changed. Thus, the stabilizer devices 14, 14' control rolling of the vehicle.

Figure 2:
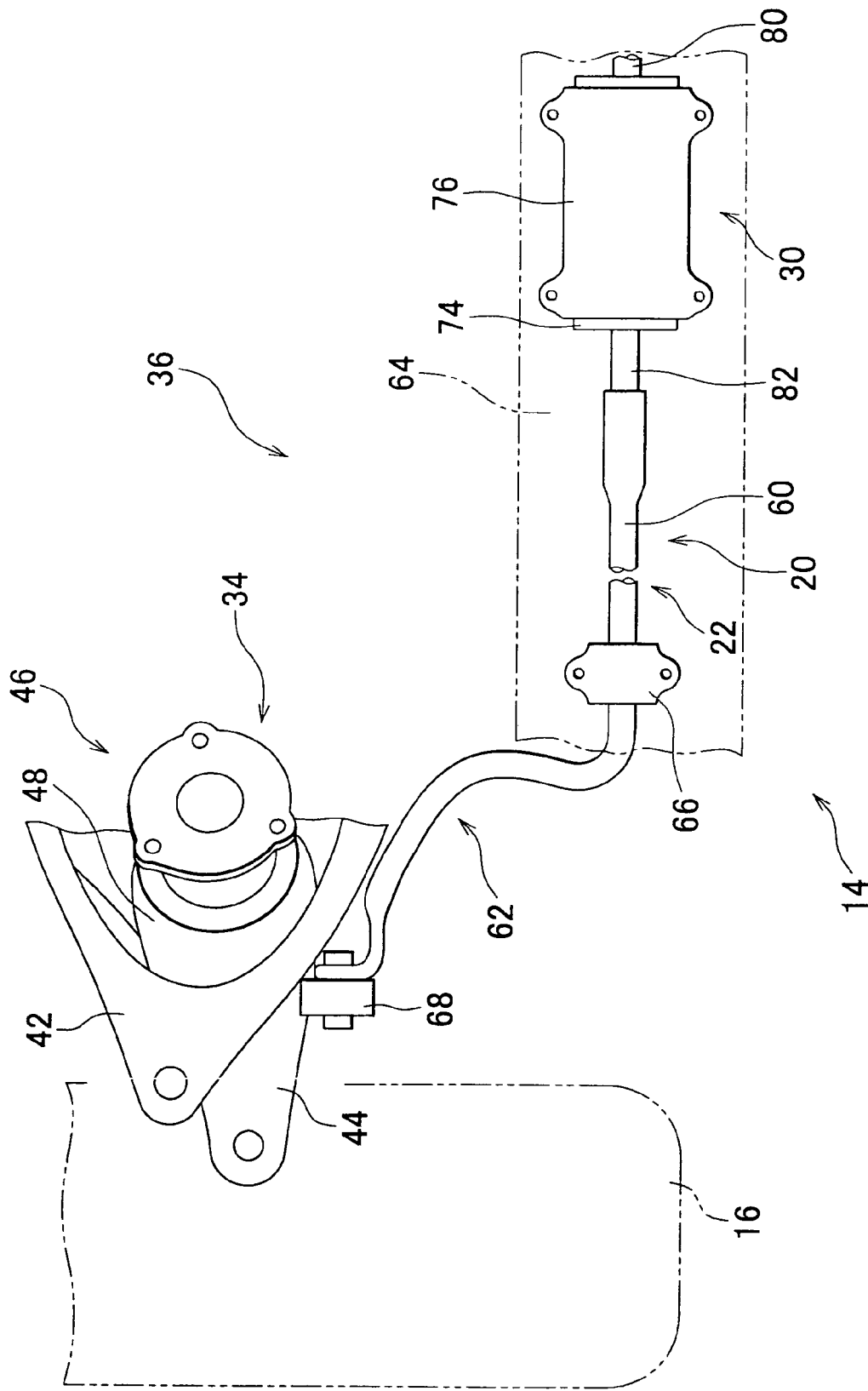
FIG. 2 illustrates a plan view of a portion of the aforementioned stabilizer device.

FIG. 2 illustrates a schematic diagram of a portion of the stabilizer device 14 on the front-wheel side from a center in a vehicle-width direction to the left wheel 16. The suspension system 10 includes four main independent suspension portions 34 that are provided for respective four wheels 16, 16'. The main suspension portion 34 in FIG. 2 is a well-known double wishbone type suspension. The main suspension portion 34 includes an upper arm 42 and a lower arm 44 that serve as the wheel-holding member. Each of the upper arm 42 and the lower arm 44 is pivotably connected to the vehicle body at one end, and is connected to the wheel 16 at the other end. Each of the upper arm 42 and the lower arm 44 is pivoted about the end (on the vehicle body side) such that the other end (on the wheel side) is moved vertically with respect to the vehicle body when a distance between the wheel 16 the vehicle body decreases or increases (i.e., the wheel 16 moves vertically with respect to the vehicle body). Also, the main suspension portion 34 includes a shock absorber 46, and a suspension spring 48. Each of the shock absorber 46 and the suspension spring 48 is connected to a member on the vehicle body side and a member on the wheel side. With this configuration, the main suspension portion 34 allows the wheel 16 to elastically support the vehicle body. Also, the main suspension portion 34 generates a damping force against vibration that is caused when the distance between the wheel 16 and the vehicle body decreases or increases. The main suspension portions 34 and the stabilizer devices 14, 14' constitute the suspension devices 36, 36'.

Each of the stabilizer devices 14, 14' includes the pair of stabilizer members described above. That is, the stabilizer device 14 includes the left stabilizer member 22 and the right stabilizer member 24. The stabilizer device 14' includes the left stabilizer member 22' and the right stabilizer member 24'. Each of the stabilizer members 22, 22', 24, 24' includes a torsion bar portion 60 and an arm portion 62. The torsion bar portion 60 extends substantially in the vehicle-width direction. The arm portion 62 is integrated with the torsion bar portion 60. The arm portion 62 extends substantially toward the front side or rear side of the vehicle. The torsion bar portion 60 of each of the stabilizer members 22, 22', 24, 24' is rotably supported by a support member 66 at a portion near the arm portion 62. The support member 66 is fixed to a stabilizer device installation portion 64 that is a portion of the vehicle body. Each of the aforementioned actuators 30, 30' is provided between ends of the torsion bar portions 60 (i.e., ends in the center in the vehicle-width direction). The ends of the torsion bar portions 60 are connected to each of the actuators 30, 30' as described in detail later. An end of the arm portion 62 (i.e., the end on the side opposite to the torsion bar portion 60 side) is connected to a stabilizer bar connection portion 68 provided in the aforementioned lower arm 44 such that the arm portion 62 can rotate with respect to the stabilizer bar connection portion 68.

Figure 3:
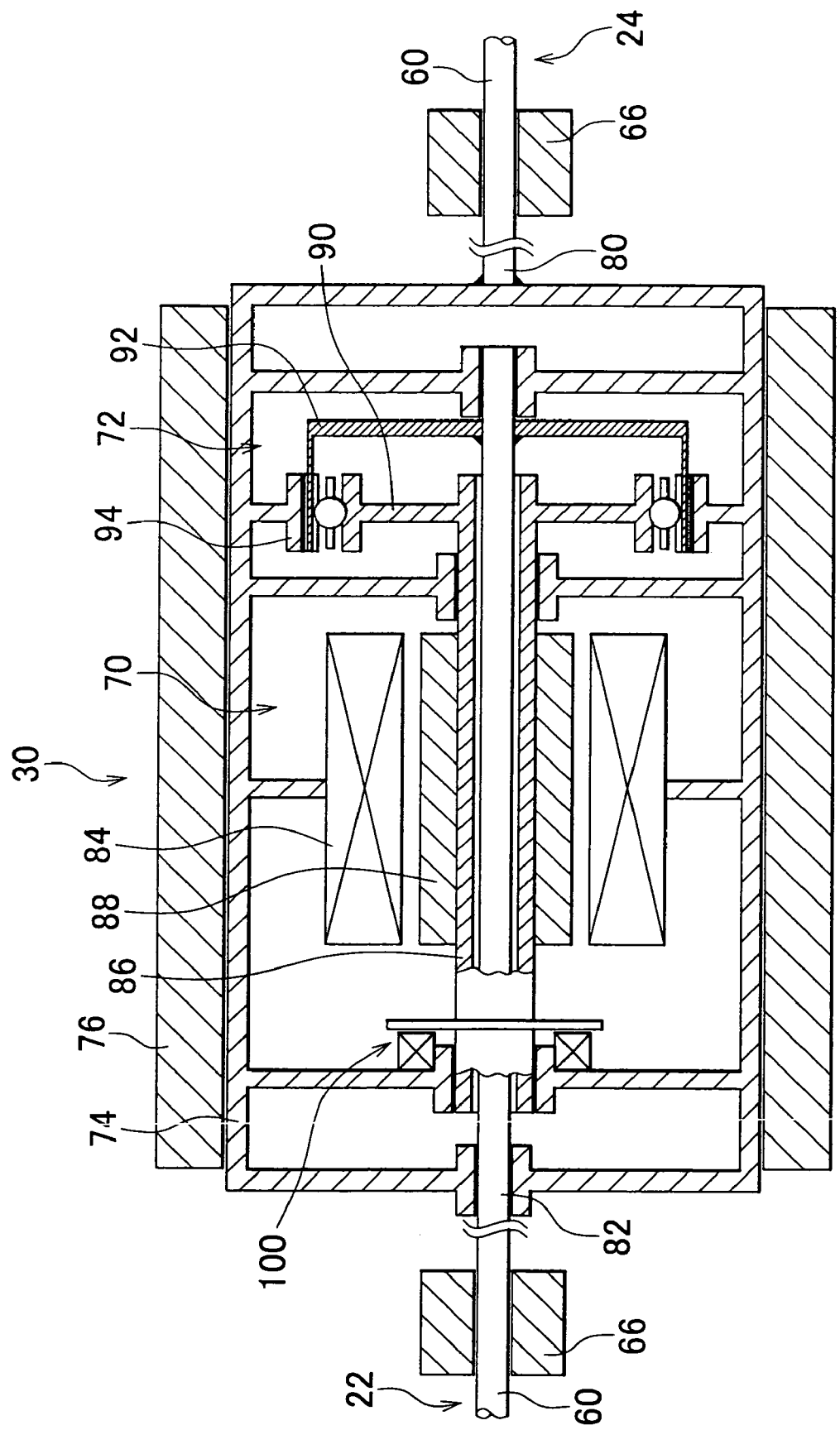
FIG. 3 illustrates a front cross sectional view of an actuator of the aforementioned stabilizer device.

As schematically shown in FIG. 3, each of the actuators 30, 30' includes an electric motor 70; and a speed reduction device 72 that reduces the rotational speed of the electric motor 70. The electric motor 70 and the speed reduction device 72 are housed in a housing 74 of each of the actuators 30, 30'. The housing 74 is supported by a housing support member 76 such that the housing 74 can rotate and cannot move in the axial direction (i.e., in the vehicle-width direction). The housing support member 76 is fixed to the stabilizer device installation portion 64. As shown in FIG. 2, two output shafts 80 and 82 extend from respective ends of the housing 74. End portions of the output shafts 80 protruding from the respective housings 74 are connected to ends of the respective stabilizer members 24, 24' using serration such that the output shafts 80 cannot rotate with respect to the stabilizer members 24, 24'. End portions of the output shafts 82 protruding from the respective housings 74 are connected to ends of the respective stabilizer members 22, 22' using serration such that the output shafts 82 cannot rotate with respect to the stabilizer members 22, 22'. Also, as shown in FIG. 3, the output shaft 80 is fixed to an end portion of the housing 74. The output shaft 82 extends in the housing 74 such that the output shaft 82 can rotate with respect to the housing 74 and cannot move in the axial direction. An end portion of the output shaft 82 that is positioned in the housing 74 is connected to the speed reduction device 72, as described in detail later.

The electric motor 70 includes a plurality of stator coils 84; a hollow motor shaft 86; and a permanent magnet 88. The plurality of stator coils 84 are fixed on a circumference along the inner peripheral wall of the housing 74. The hollow motor shaft 86 is rotatably supported by the housing 74. The permanent magnet 88 is fixed on a circumference in the outer periphery of the motor shaft 86 such that the permanent magnet 88 faces the stator coils 84. The electric motor 70 is a DC brush-less motor where the stator coils 84 function as a stator, and the permanent magnet 88 functions as a rotor.

The speed reduction device 72 includes a wave generator 90; a flexible gear (flex spline) 92; and a ring gear (circular spline) 94. The speed reduction device 72 is configured as a wave gear device (may be referred to as "harmonic drive mechanism (registered trademark)", "harmonic gear mechanism", "strain wave gear ring mechanism" or the like). The wave generator 90 is formed by fitting ball bearings in the outer periphery of an oval cam, and is fixed to the outer periphery of an end portion of the motor shaft 86. The flexible gear 92 has a cup shape and the peripheral wall portion thereof can be elastically deformed. A plural teeth are formed on the outer periphery of the peripheral wall portion on the opening side. The flexible gear 92 is supported by the aforementioned output shaft 82. More specifically, the output shaft 82 extends through the motor shaft 86. A bottom portion of the flexible gear 92 is fixed to the end portion of the output shaft 82 that protrudes from the motor shaft 86, whereby the flexible gear 92 is connected to the output shaft 82. The ring gear 94 has a substantially ring shape. A plurality of teeth are formed in the inner periphery of the ring gear 94 (the number of teeth of the ring gear 94 is slightly larger than that of the flexible gear 92, for example, by two). The ring gear 94 is fixed to the housing 74. The peripheral wall portion of the flexible gear 92 is fitted to the outer portion of the wave generator 90 such that the flexible gear 92 is elastically deformed to an oval shape. The flexible gear 92 is engaged with the ring gear 94 at two portions in the longitudinal direction of the oval, and is not engaged with the ring gear 94 at portions other than the two portions. If the wave generator 90 is rotated once (i.e., by 360 degrees), the flexible gear 92 and the ring gear 94 are rotated with respect to each other by an amount equivalent to the difference in the number of teeth between the flexible gear 92 and the ring gear 94.

With the aforementioned configuration, if the electric motors 70 are rotated, that is, if the actuators 30, 30' are operated, the torsion bar portions 60 of the left stabilizer members 22, 22' and the torsion bar portions 60 of the right stabilizer members 24, 24' are rotated with respect to each other. As a result, the stabilizer bars 20, 20', which are composed of the respective left stabilizer member 22, 22' and the respective right stabilizer members 24, 24', are twisted. The forces generated by twisting the stabilizer bars 20, 20' are applied as the forces to decrease or increase the distance between each of the left and right wheels 16 and the vehicle body. That is, in the stabilizer devices 14, 14', the elastic forces of the stabilizer bars 20, 20' are changed by operating the actuators 30, 30', whereby roll stiffness on the front-wheel side and that on the rear-wheel side are controlled individually.

Figure 4:
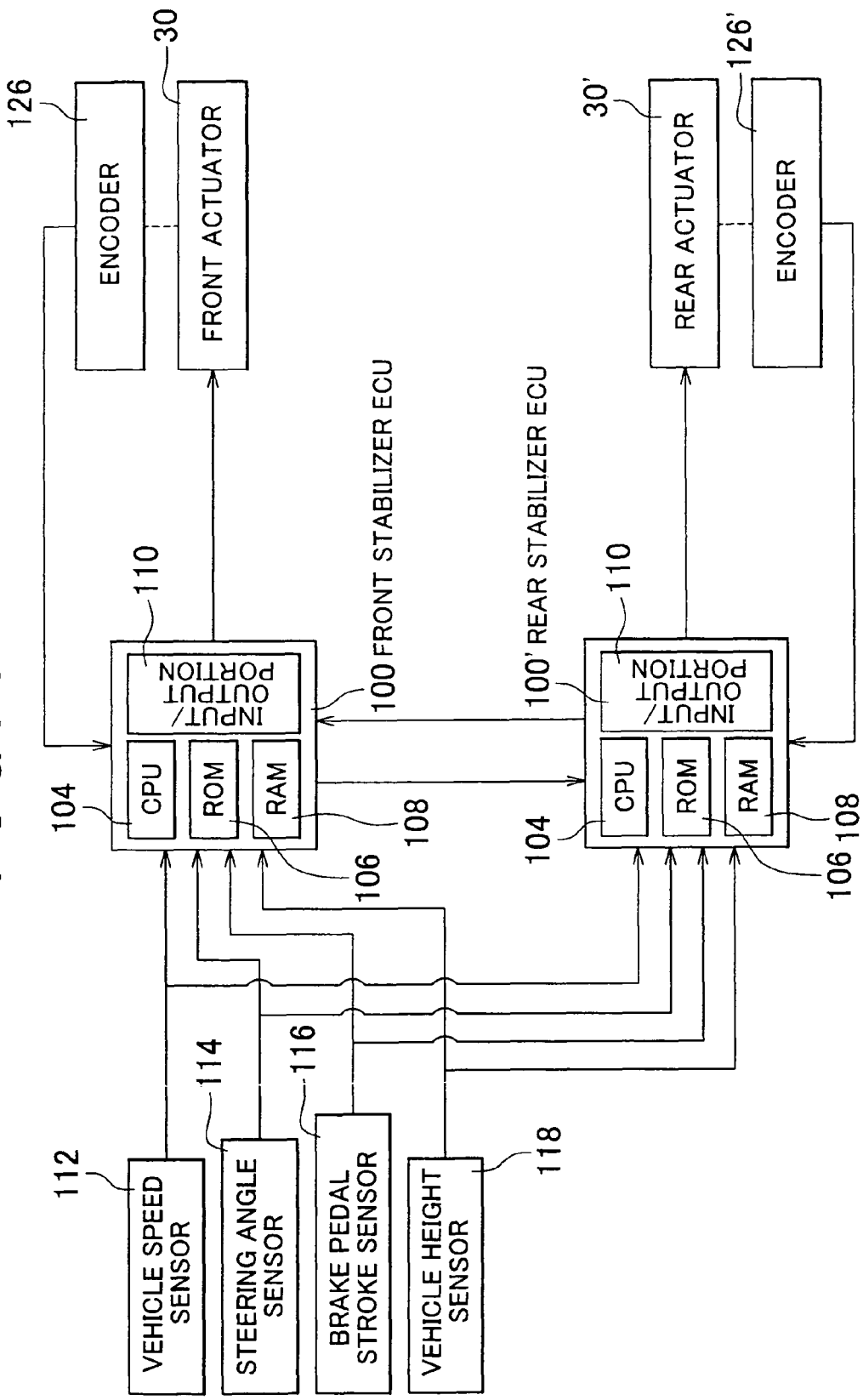
FIG. 4 illustrates a block diagram of a control device of the aforementioned suspension system.

The aforementioned stabilizer device 14 (suspension device 36) on the front-wheel side is controlled by a front stabilizer ECU (electronic control unit) 100. The aforementioned stabilizer device 14' (suspension device 36') on the rear-wheel side is controlled by a rear stabilizer ECU 100'. That is, the stabilizer device 14 and the stabilizer device 14' are controlled independently of each other. Accordingly, as shown in FIG. 1 and FIG. 4, the actuator 30 on the front-wheel side (i.e., front actuator 30) is connected to the front stabilizer ECU 100. The actuator 30' on the rear-wheel side (i.e., rear actuator 30') is connected to the rear stabilizer ECU 100'. Information is transmitted between the front stabilizer ECU 100 and the rear stabilizer ECU 100' using communication means.

Basically, the front stabilizer ECU 100 and the rear stabilizer ECU 100' have the same configuration. Each of the front stabilizer ECU 100 and the rear stabilizer ECU 100' mainly includes a computer. The computer includes a CPU 104, ROM 106, RAM 108, and an input/output portion 110. The input/output portion 110 is connected to a vehicle speed sensor 112 that is a vehicle speed detecting device; a steering angle sensor 114 that is a steering amount detecting device; a brake pedal stroke sensor 116 that is a brake operation amount detecting device; and four vehicle height sensors 118 that correspond to the front-left and front-right wheels 16 and the rear-left and rear-right wheels 16'. Further, the input/output portion 110 is connected to the front actuator 30 (or rear actuator 30') via a drive circuit (not shown). Encoders 126, 126' are provided for the actuators 30, 30', respectively. The drive circuit controls each of the actuators 30, 30' so that a rotational angle detected by each of the encoders 126, 126' becomes equal to a rotational angle command value (i.e., a command value concerning the rotational angle of the permanent magnet 88 with respect to the stator coils 84). The rotational angle command value is a drive command value determined based on a target rotational angle described later, and is sent from the computer.

Various programs such as a target rotational angle determining routine and an actual rotational angle determining routine are stored in the ROM 106 of each of the front stabilizer ECU 100 and the rear stabilizer ECU 100'. Each of the front stabilizer ECU 100 and the rear stabilizer ECU 100' executes the common target rotational angle determining routine and the common actual rotational angle determining routine. Therefore, the target rotational angles of the actuators 30, 30' on the front-wheel side and on the rear-wheel side are determined independently of each other.

Figure 5:
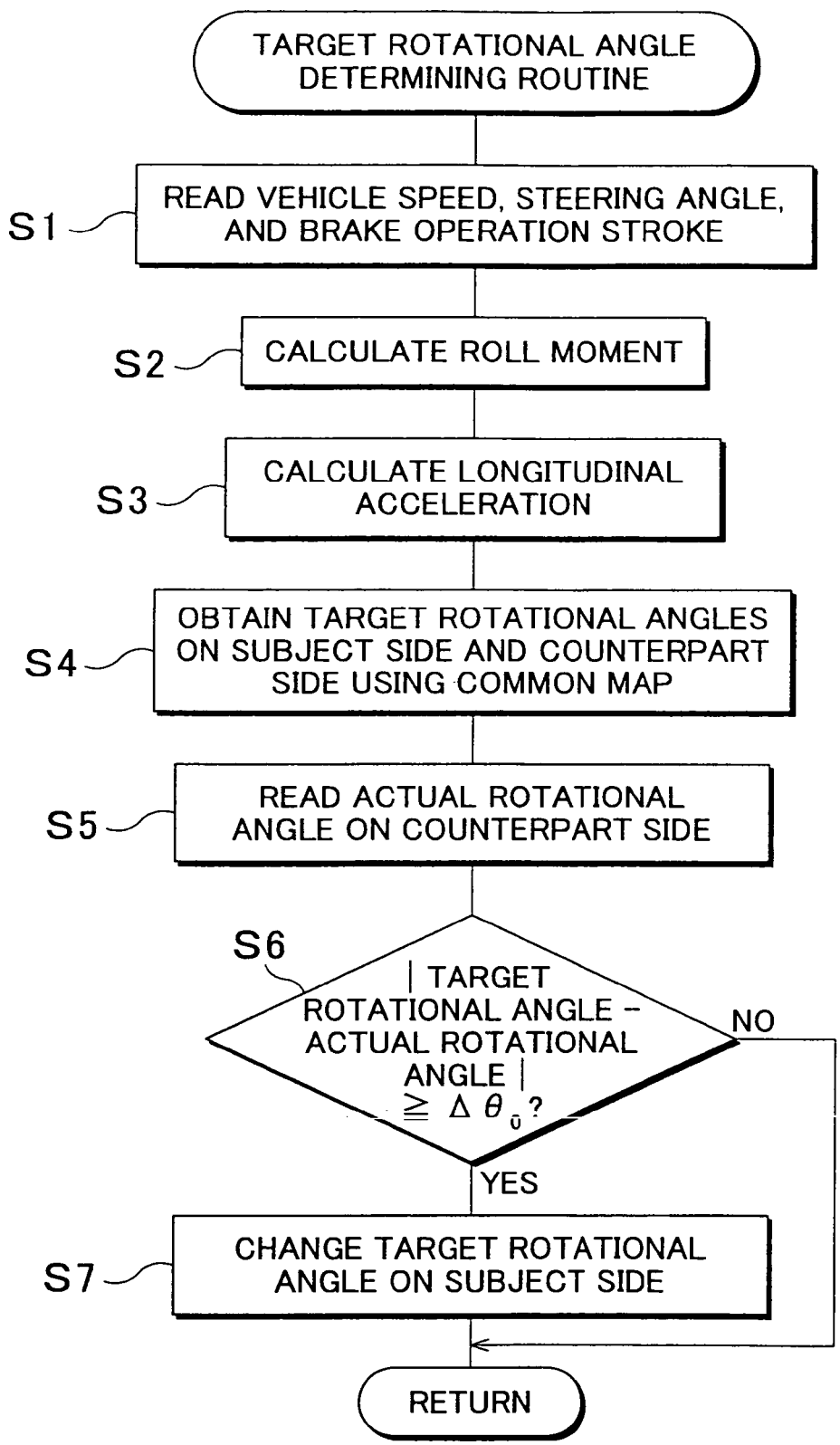
FIG. 5 illustrates a flowchart of a target rotational angle determining routine executed by the aforementioned control device.

The target rotational angle determining routine will be described with reference to a flowchart in FIG. 5. As an example, the target rotational angle determining routine executed by the rear stabilizer ECU 100' will be described. First, in step S1, a vehicle speed detected by the vehicle speed sensor 112, a steering angle detected by the steering angle sensor 114, a brake operation stroke detected by the brake pedal stroke sensor 116 are read. In step S2, on the basis of the vehicle speed and the steering angle that are read, a roll moment is calculated by a known method. Subsequently, in step S3, on the basis of the brake operation stroke read in step S1, longitudinal acceleration that is acceleration in the longitudinal direction of the vehicle body) is calculated. In step S4, on the basis of the calculated roll moment and the longitudinal acceleration, the target rotational angle of the actuator 30' on a subject side (rear-wheel side) and the target rotational angle of the actuator 30 on a counterpart side (front-wheel side) are obtained using a common map. Because the target rotational angles are obtained using a known method, detailed description of the method is omitted. The common map is stored in each of the front stabilizer ECU 100 and the rear stabilizer ECU 100'. In the map in this embodiment, an axis (for example, a vertical axis) indicates the roll moment, and another axis (horizontal axis) indicates the longitudinal acceleration. Values of the target rotational angle corresponding to the values of the roll moment and the longitudinal acceleration are measured or calculated in advance so that a designed roll stiffness distribution ratio between the front-wheel side and the rear-wheel side is achieved. The obtained values of the target rotational angle are stored in the form of the map. On the basis of the calculated roll moment and the longitudinal acceleration, each of the front and rear target rotational angles is determined uniquely using this common map.

Figure 6:
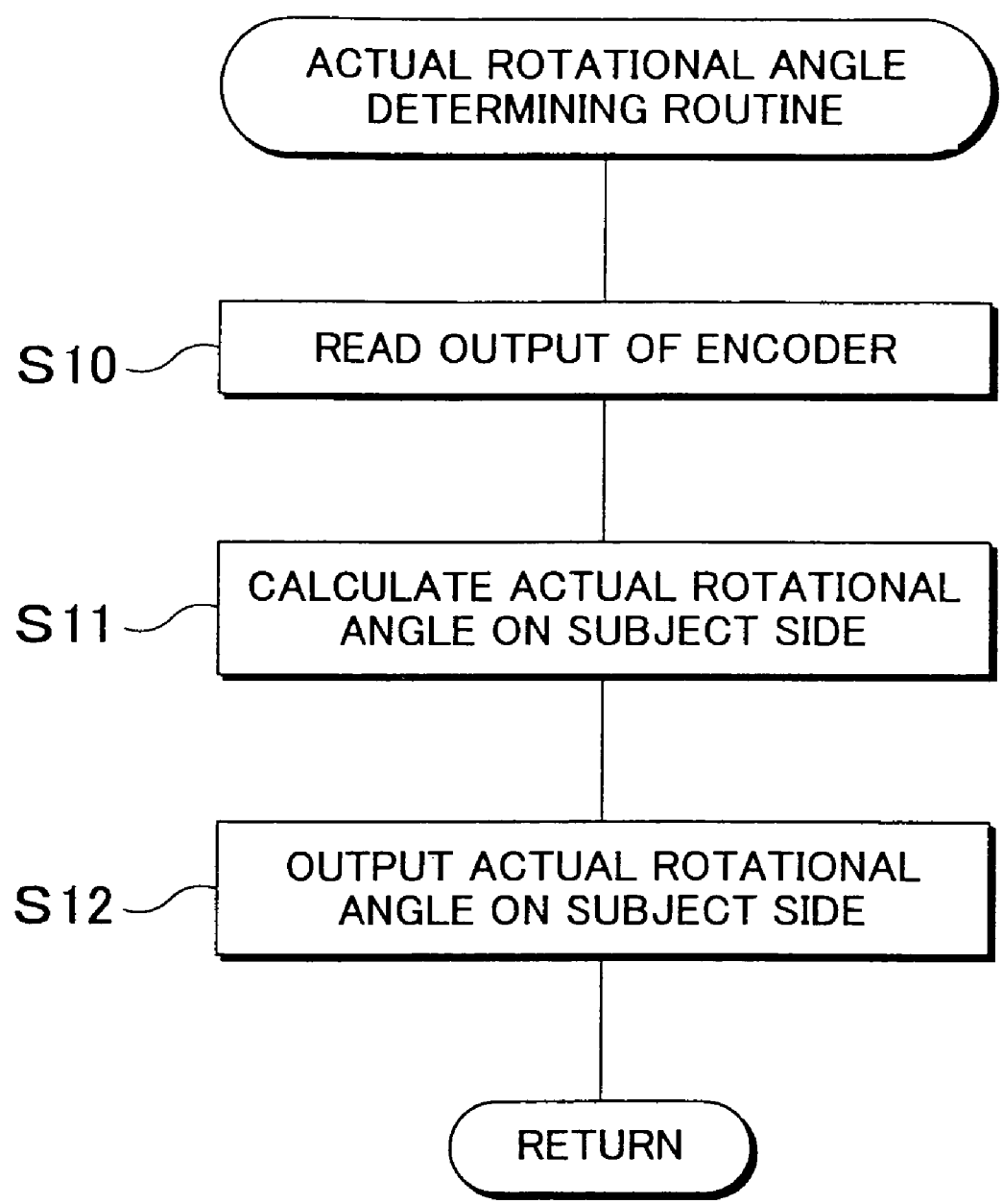
FIG. 6 illustrates a flowchart of an actual rotational angle determining routine executed by the aforementioned control device.

In step S5, an actual rotational angle on the counterpart side (front-wheel side) is read. Each of the actual rotational angles on the front-wheel side and on the rear-wheel side is obtained by the actual rotational angle determining routine shown in FIG. 6. As an example, the actual rotational angle determining routine executed by the front stabilizer ECU 100 will be described with reference to FIG. 6. In step S10 of the actual rotational angle determining routine, the rotational angle detected and output by the encoder 126 is read. In step S11, the actual rotational angle of the actuator 30 on the subject side (front-wheel side) is calculated based on the detected rotational angle. Subsequently, in step S12, the actual rotational angle on the subject side (front-wheel side) is output, and transmitted to the rear stabilizer ECU 100'. In step S5, the actual rotational angle that is output in the aforementioned manner is read on the counterpart side. That is, in this embodiment, the actual rotational angle on the front-wheel side is transmitted to the rear stabilizer ECU 100' and the actual rotational angle on the rear-wheel side is transmitted to the front stabilizer ECU 100. The target rotational angles and the actual rotational angles of the actuators 30, 30' are expressed as positive values in both of the case where the vehicle turns to the right and the case where the vehicle turns to the left.

Referring to the target rotational angle determining routine again, in step S6, it is determined whether the actual rotational angle on the counterpart side (front-wheel side) that is read in step S5 differs from the target rotational angle of the counterpart side (front-wheel side) that is obtained in step S4 by a set amount or greater. In this embodiment, it is determined whether the absolute value of a difference obtained by subtracting the actual rotational angle on the counterpart side from the target rotational angle on the counterpart side is equal to or greater than a set angle difference $\Delta\theta_0$. If a negative determination is made in step S6 (i.e., NO in step S6), the roll stiffness distribution ratio between the front-wheel side and the rear-wheel side is in an appropriate range. Then, the target rotational angle obtained in step S4 is output without being changed, and thus the target rotational angle determining routine is completed once.

If an affirmative determination is made in step S6 (i.e., YES in step S6), it is determined that the roll stiffness on the counterpart side (front-wheel side) is insufficient due to insufficient driving performance of the actuator 30 on the counterpart side (front-wheel side). Therefore, in step S7, the target rotational angle on the subject side (rear-wheel side) where the driving performance of the actuator 30' is sufficient is changed so that the roll stiffness distribution ratio between the front-wheel side and the rear-wheel side comes close to a predetermined appropriate value, and the changed target rotational angle on the subject side (rear-wheel side) is output. That is, the target rotational angle on the rear-wheel side is determined so that a rear target rotational angle/front actual rotational angle ratio becomes equal to a set ratio. The rear target rotational angle/front actual rotational angle ratio is the ratio of the target rotational angle on the rear-wheel side to the actual rotational angle on the front-wheel side.

As apparent from the above description, in the embodiment, the stabilizer device 14 constitutes the front roll stiffness changing device. The stabilizer device 14' constitutes the rear roll stiffness changing device. Also, in the embodiment, each of the front stabilizer ECU 100 and the rear stabilizer ECU 100' includes the actual roll stiffness correspondence amount supply portion. The front stabilizer ECU 100 is regarded as the front control device. The rear stabilizer ECU 100' is regarded as the rear control device. Also, each of the front stabilizer ECU 100 and the rear stabilizer ECU 100' includes the roll stiffness distribution control device. The encoder 126 constitutes the actuator operation amount detecting device included in the front actual roll stiffness correspondence amount obtaining device. The encoder 126' constitutes the actuator operation amount detecting device included in the rear actual roll stiffness correspondence amount obtaining device. In this embodiment, each of the target rotational angles of the actuators 30, 30' is obtained as the target value for controlling the roll stiffness correspondence amount that corresponds one-to-one with the roll stiffness. Each of the actual rotational angles (operation amounts) of the actuators 30, 30' detected by the encoders 126, 126' is obtained as the actual roll stiffness correspondence amount. A portion of the front stabilizer ECU 100 that executes steps S1 to S4 of the target rotational angle determining routine constitutes the independent front target roll stiffness determining portion. A portion of the rear stabilizer ECU 100' that executes steps S1 to S4 of the target rotational angle determining routine constitutes the independent rear target roll stiffness determining portion. A portion of each of the front stabilizer ECU 100 and the rear stabilizer ECU 100', which executes steps S5 to S7 of the target rotational angle determining routine, constitutes the dependent target roll stiffness determining portion. Particularly, a portion that executes step S7 constitutes the set distribution ratio correspondence determining portion. A portion that executes step S7 when an affirmative determination is made in step S6 constitutes the roll stiffness determining portion selection portion. The roll stiffness determining portion selection portion includes the front selection portion and the rear selection portion. In this embodiment, the rear selection portion selects the dependent target roll stiffness determining portion that determines the target rotational angle of the stabilizer device 14' on the rear-wheel side according to the actual rotational angle on the front-wheel side if the actual rotational angle (i.e., the actual roll stiffness correspondence amount) on the front-wheel side that is supplied from the front stabilizer ECU 100 differs from the target rotational angle (i.e., the target roll stiffness correspondence amount) on the front-wheel side that is obtained by the rear stabilizer ECU 100' by a set amount or greater.

In this embodiment, the actual rotational angle of the actuator 30 on the front-wheel side can be transmitted to the rear stabilizer ECU 100', and the actual rotational angle of the actuator 30' on the rear-wheel side can be transmitted to the front stabilizer ECU 100. Therefore, the target rotational angle on the side where the driving performance of the actuator 30 or 30' is sufficient can be changed (reduced) according to the actual rotational angle on the counterpart side. As a result, the roll stiffness distribution ratio between the front-wheel side and the rear-wheel side can be constantly maintained in an appropriate range.

In this embodiment, the target rotational angles are obtained based on the roll moment and the longitudinal acceleration using the common map. However, the target rotational angles may be obtained by a known calculation method, without using the map.

Figure 7:
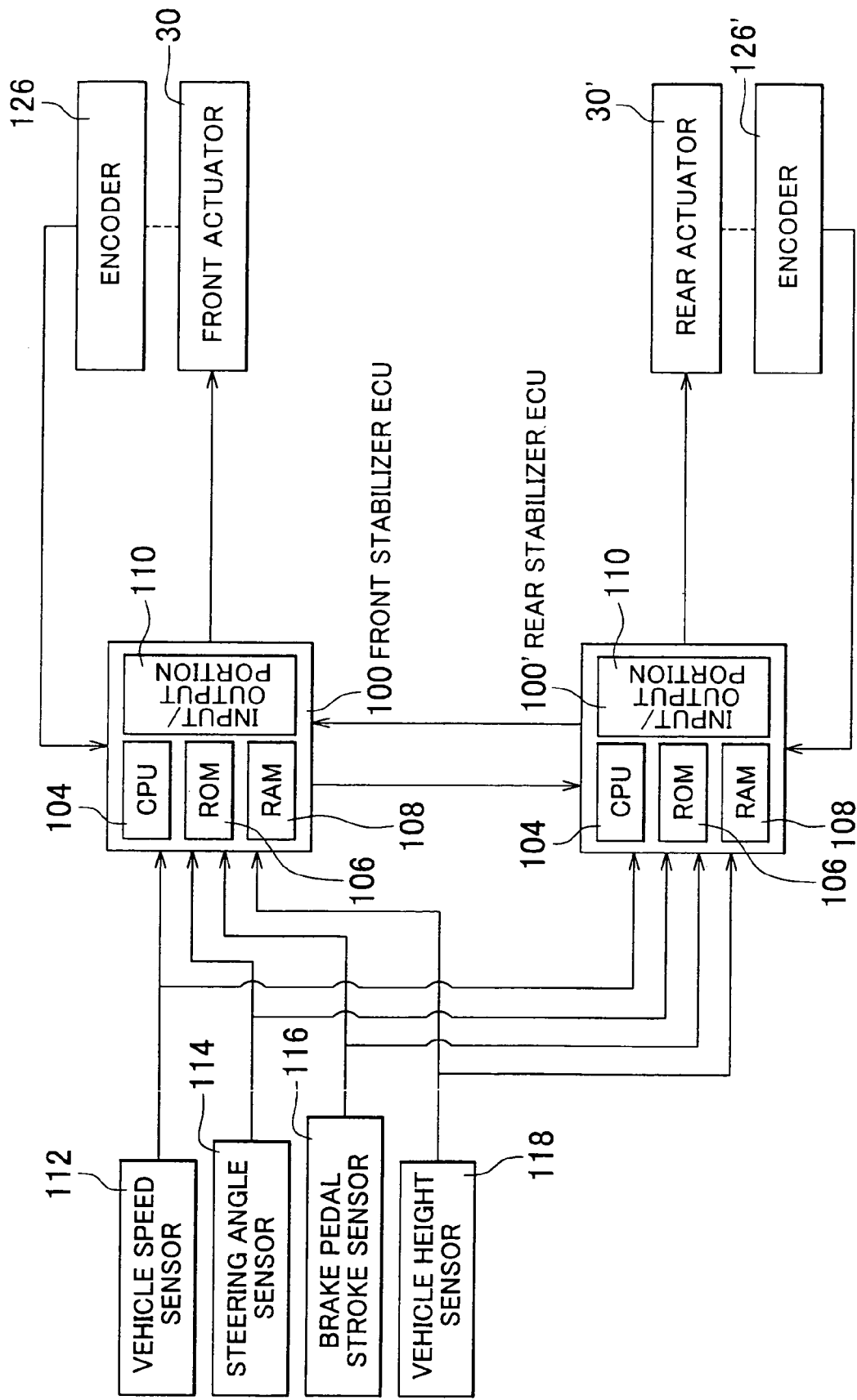
FIG. 7 illustrates a block diagram of a control device of a suspension system according to another embodiment.

There is the case where only the driving performance of the actuator 30 on the front-wheel side may become insufficient and the driving performance of the actuator 30' on the rear-wheel side is always sufficient. Alternatively, there is the case where only the driving performance of the actuator 30' on the rear-wheel side may become insufficient and the driving performance of the actuator 30 on the front-wheel side is always sufficient. For example, in the case where only the driving performance of the actuator 30 on the front-wheel side may become insufficient, the configuration may be such that the actual rotational angle of the actuator 30 is output from the front stabilizer ECU 100 to the rear stabilizer ECU 100', and the actual rotational angle of the actuator 30' is not output from the rear stabilizer ECU 100' to the front stabilizer ECU 100, as shown in FIG. 7. In this case, the rear stabilizer ECU 100' on the rear-wheel side changes the target rotational angle on the rear-wheel side according to the actual rotational angle on the front-wheel side. Because the target rotational angle determining routine and the actual rotational angle determining routine can be executed in the same manner as shown in FIG. 1 to FIG. 6, illustration and description thereof will be omitted. However, in the target rotational angle determining routine, the subject side is determined to be the rear-wheel side, and the counterpart side is determined to be the front-wheel side uniquely. In the actual rotational angle determining routine, the subject side is determined to be the front-wheel side. In the embodiment, the front stabilizer ECU 100 includes the actual roll stiffness correspondence amount supply portion. The front stabilizer ECU 100 includes the independent target roll stiffness determining portion. The rear stabilizer ECU 100' includes the independent target roll stiffness determining portion and the dependent target roll stiffness determining portion. The roll stiffness distribution control device in this embodiment includes the independent target roll stiffness determining portion of the front stabilizer ECU 100, and the independent target roll stiffness determining portion and the dependent target roll stiffness determining portion of the rear stabilizer ECU 100'.

Figure 8:
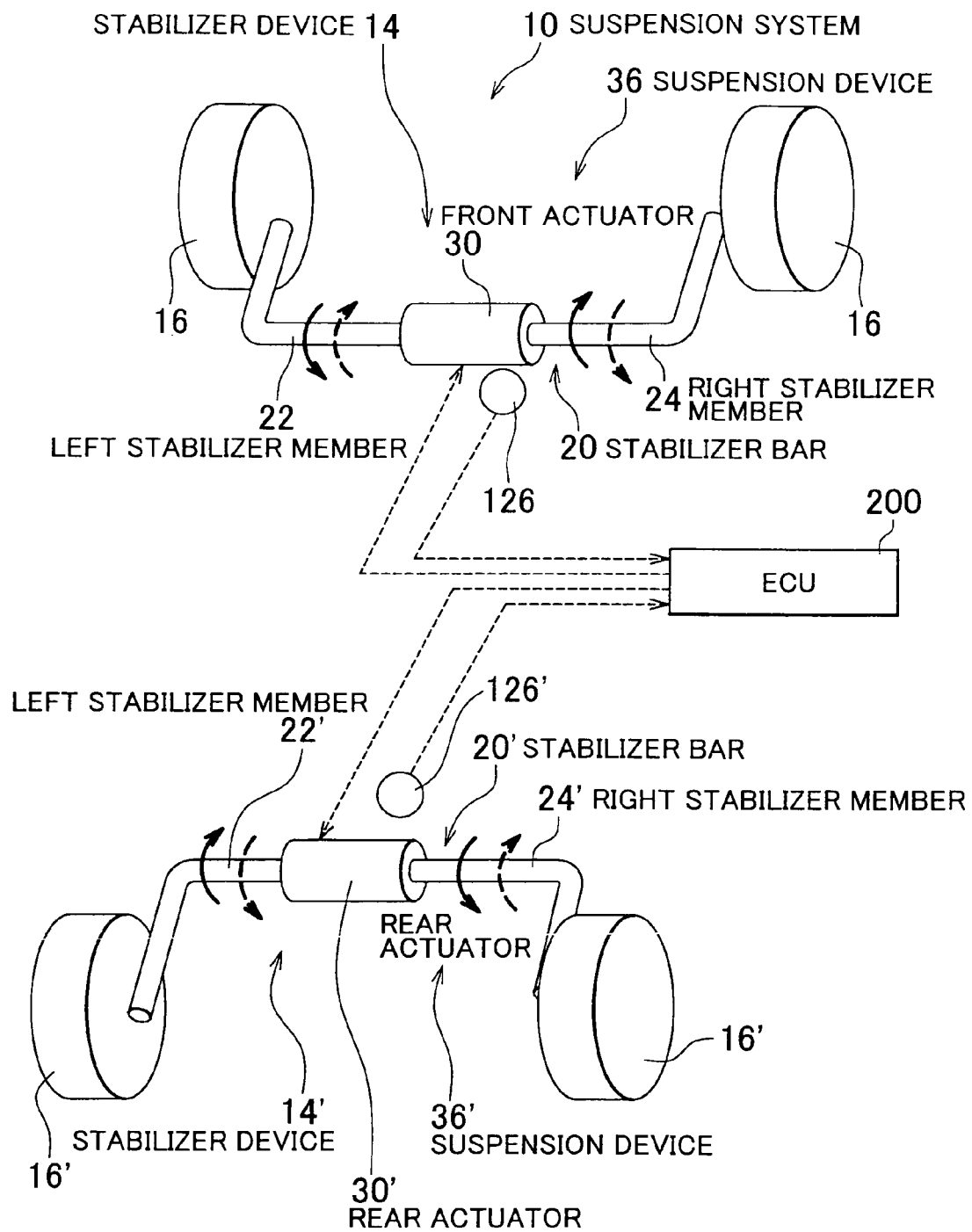
FIG. 8 illustrates a perspective view of a stabilizer device of a suspension system according to a yet another embodiment.
Figure 9:
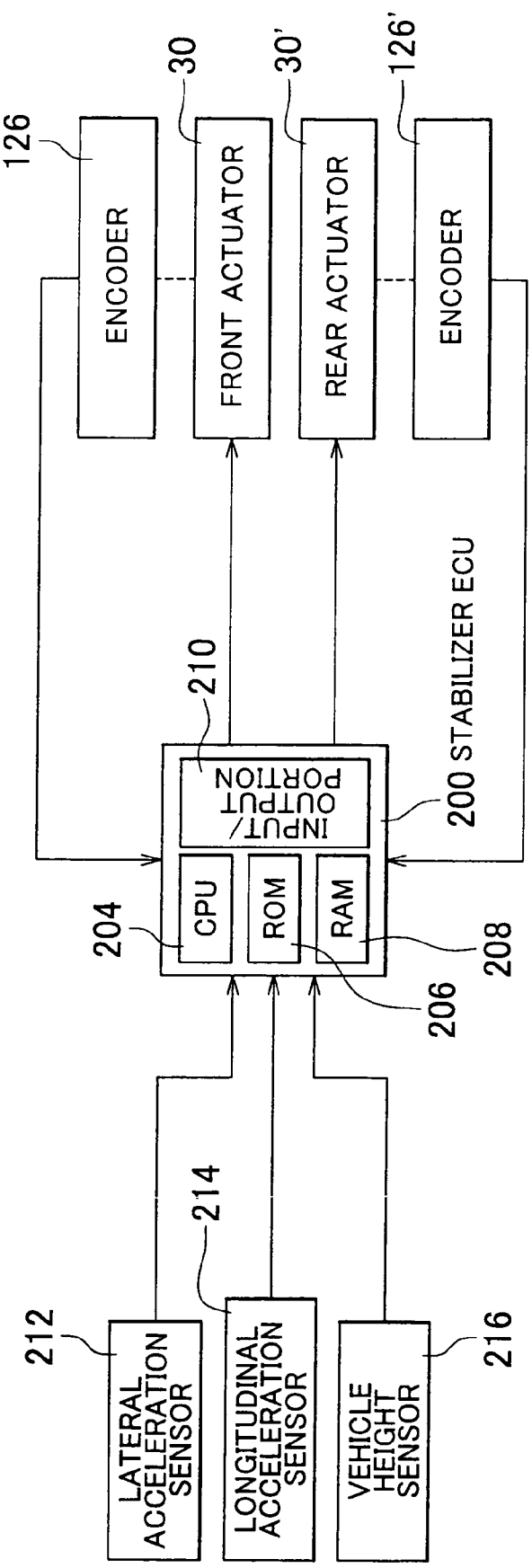
FIG. 9 illustrates a block diagram of a control device of the aforementioned suspension system.
Figure 10:
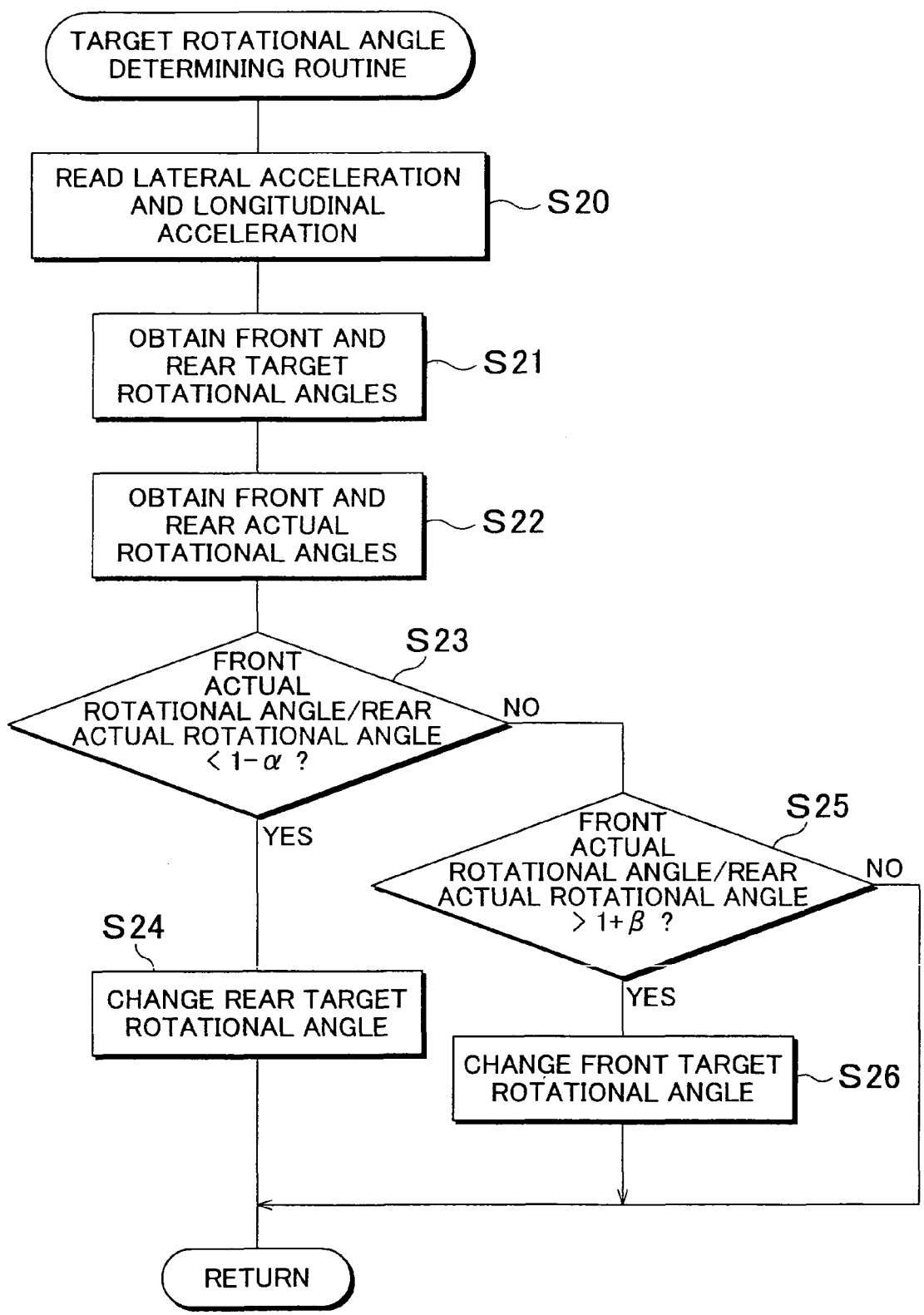
FIG. 10 illustrates a flowchart of a target rotational angle determining routine executed by the aforementioned control device.

A suspension system according to another embodiment will be described with reference to FIG. 8 to FIG. 10. In this embodiment, the same and corresponding components as those in the aforementioned embodiment shown in FIG. 1 to FIG. 6 are denoted by the same reference numerals, and description thereof will be omitted. Only portions different from those in the aforementioned embodiment will be described. In this embodiment, the stabilizer device 14 (suspension device 36) on the front-wheel side and the stabilizer device 14' (suspension device 36') on the rear-wheel side are controlled by a common stabilizer ECU 200. The stabilizer ECU 200 mainly includes a computer. The computer includes a CPU 204, ROM 206, RAM 208, and an input/output portion 210.

The input/output portion 210 is connected to a lateral acceleration sensor 212; a longitudinal acceleration sensor 214; and four vehicle height sensors 216. The lateral acceleration sensor 212 detects the lateral acceleration that is acceleration in the lateral direction of the vehicle body. The longitudinal acceleration sensor 214 detects the longitudinal acceleration that is the acceleration in the longitudinal direction of the vehicle body. The four vehicle height sensors 216 correspond to the front-left and front-right wheels 16 and the rear-left and rear-right wheels 16', respectively. The input/output portion 210 is further connected to encoders 126, 126' for the front and rear actuators 30, 30' via a drive circuit (not shown).

Various programs such as the target rotational angle determining routine are stored in the ROM 206 of the stabilizer ECU 200. By executing the target rotational angle determining routine, the target rotational angles of the actuators 30, 30' on the front-wheel side and on the rear-wheel side are determined.

The target rotational angle determining routine will be described with reference to a flowchart shown in FIG. 10. First, in step S20, the lateral acceleration measured by the lateral acceleration sensor 212, and the longitudinal acceleration measured by the longitudinal acceleration sensor 214 are read. In step S21, on the basis of the lateral acceleration and the longitudinal acceleration that are read, the target rotational angles on the front-wheel side and on the rear-wheel side are obtained using the map. In the map, an axis (for example, a vertical axis) indicates the roll moment, and another axis (horizontal axis) indicates the longitudinal acceleration. Values of the target rotational angle are measured or calculated in advance so that a set roll stiffness distribution ratio between the front-wheel side and the rear-wheel side is achieved. The obtained values of the target rotational angle are stored in the form of the map. Subsequently, in step S22, the actual rotational angles of the actuators 30, 30' that are detected by the encoders 126, 126' are obtained.

Both of the actual rotational angles on the front-wheel side and on the rear-wheel side are obtained as described above. On the basis of the actual rotational angles on the front-wheel side and on the rear-wheel side, the actual roll stiffness distribution ratio is obtained. In this embodiment, the actual roll stiffness ratio is expressed as the ratio of the front actual rotational angle to the rear actual rotational angle (front actual rotational angle/rear actual rotational angle). In step S23, it is determined whether the actual roll stiffness distribution ratio is less than a first set value $1-\alpha$. The value a is a predetermined permissible value that is less than 1. If it is determined that the actual roll stiffness distribution ratio is less than the first set value $1-\alpha$ in step S23, it is determined that the roll stiffness on the front-wheel side is insufficient, and the target rotational angle on the rear-wheel side where the driving performance is sufficient is changed so that the actual roll stiffness distribution ratio comes close to an appropriate value in step S24.

If a negative determination is made in step S23, it is determined whether the actual roll stiffness distribution ratio is greater than a second set value $1+\beta$ in step S25. The value $\beta$ is a predetermined permissible value that is less than 1. If it is determined that the actual roll stiffness distribution ratio is greater than the second set value $1+\beta$, it is determined that the roll stiffness on the rear-wheel side is insufficient, and the target rotational angle on the front-wheel side is changed so that the actual roll stiffness distribution ratio comes close to an appropriate value in step S25. If negative determinations are made in step S23 and S25, it is determined that the actual roll stiffness distribution ratio is in an appropriate permissible range, and the actuators 30, 30' are controlled based on the front and rear target rotational angles without changing the front and rear target rotational angles.

In this embodiment, the roll stiffness distribution control device is provided in the stabilizer ECU 200. The encoder 126 constitutes the actuator operation amount detecting device included in the front actual roll stiffness correspondence amount obtaining device. The encoder 126' constitutes the actuator operation amount detecting device included in the rear actual roll stiffness correspondence amount obtaining device. In this embodiment as well, each of the target rotational angles of the actuators 30, 30' is obtained as the target value for controlling the roll stiffness correspondence amount that corresponds one-to-one with the roll stiffness. Each of the actual rotational angles (operation amounts) of the actuators 30, 30' detected by the encoders 126, 126' is obtained as the actual roll stiffness correspondence amount. A portion of the stabilizer ECU 200 that executes steps S24 and S26 of the target rotational angle determining routine constitutes the dependent target roll stiffness determining portion. A portion of the stabilizer ECU 200 that executes steps S22, S23, and S25 constitutes the actual roll stiffness distribution ratio obtaining portion. A portion that executes step S24 when an affirmative determination is made in step S23, and a portion that executes step S26 when an affirmative determination is made in step S25 constitute the actual roll stiffness distribution ratio base selection portion.

What is claimed is:

1. A suspension system comprising:
   a front roll stiffness changing device comprising a front stabilizer bar with an actuator that changes roll stiffness on a front-wheel side of a vehicle;
   a rear roll stiffness changing device comprising a rear stabilizer bar with an actuator that changes roll stiffness on a rear-wheel side of the vehicle; and
   a roll stiffness distribution control device that controls the roll stiffness distribution between the front-wheel side and the rear-wheel side by controlling the front and rear roll stiffness changing devices based on respective front and rear target roll stiffness corresponding amounts determined in independent front and rear target roll stiffness determining portions, respectively, and defining a predetermined roll stiffness ratio between the front and rear wheel sides,
   wherein the roll stiffness distribution control device further includes:
   front and rear actual roll stiffness correspondence amount obtaining devices for obtaining an actual roll stiffness correspondence amount on the front and rear wheel sides, respectively;
   actuator driving performance insufficiency determining means for determining an insufficiency if the front or rear actual roll stiffness correspondence amount differs from the respective target front or rear roll stiffness correspondence amount by a set amount or greater; and
   a dependent target roll stiffness determining portion that, when an actuator driving performance insufficiency is determined in one of the front or rear roll stiffness changing devices, determines a target roll stiffness correspondence amount of the other of the front or rear roll stiffness changing devices, according to an actual roll stiffness correspondence amount obtained by the corresponding actual roll stiffness correspondence amount obtaining device on the side where the driving performance is determined to be insufficient such that the target roll stiffness corresponding amount on the side where the driving performance of the actuator is reduced, such that the roll stiffness distribution ratio between the front and rear wheel sides is maintained in an appropriate range despite an insufficiency of one of the driving actuators.

2. The suspension system according to claim 1, wherein:
the dependent target roll stiffness determining portion includes a set distribution ratio correspondence determining portion that determines the target roll stiffness correspondence amount of at least one of the front roll stiffness changing device and the rear roll stiffness changing device so that a target/actual roll stiffness distribution ratio becomes equal to a set distribution ratio; and
the target/actual roll stiffness distribution ratio is a ratio of the target roll stiffness correspondence amount of the at least one of the front roll stiffness changing device and the rear roll stiffness changing device to the actual roll stiffness correspondence amount of a counterpart of the at least one of the front roll stiffness changing device and the rear roll stiffness changing device.

3. The suspension system according to claim 1, wherein the roll stiffness distribution control device includes a roll stiffness determining portion selection portion which ordinarily selects the independent front target roll stiffness determining portion and the independent rear target roll stiffness determining portion, and which selects the dependent target roll stiffness determining portion if an actual roll stiffness distribution ratio between the front-wheel side and the rear-wheel side differs from a set roll stiffness distribution ratio by a set amount or greater as a result of executing a roll stiffness control based on the front target roll stiffness correspondence amount determined by the independent front target roll stiffness determining portion and the rear target roll stiffness correspondence amount determined by the independent rear target roll stiffness determining portion.

4. The suspension system according to claim 3, further comprising:
wherein the roll stiffness determining portion selection portion includes a rear selection portion and a front selection portion,
the rear selection portion selects the dependent target roll stiffness determining portion that determines the target roll stiffness correspondence amount of the rear roll stiffness changing device according to the front actual roll stiffness correspondence amount obtained by the front actual roll stiffness correspondence amount obtaining device if the front actual roll stiffness correspondence amount differs from the front target roll stiffness correspondence amount determined by the independent front target roll stiffness determining portion by a set amount or greater, and
the front selection portion selects the dependent target roll stiffness determining portion that determines the target roll stiffness correspondence amount of the front roll stiffness changing device according to the rear actual roll stiffness correspondence amount obtained by the rear actual roll stiffness correspondence amount obtaining device if the rear actual roll stiffness correspondence amount differs from the rear target roll stiffness correspondence amount determined by the independent rear target roll stiffness determining portion by a set amount or greater.

5. The suspension system according to claim 3, further comprising:
wherein the roll stiffness determining portion selection portion includes an actual roll stiffness distribution ratio obtaining portion, and an actual roll stiffness distribution ratio base selection portion,
wherein the actual roll stiffness distribution ratio obtaining portion obtains an actual roll stiffness distribution ratio that is an actual roll stiffness distribution ratio between the front-wheel side and the rear-wheel side, based on the front actual roll stiffness correspondence amount obtained by the front actual roll stiffness correspondence amount obtaining device and the rear actual roll stiffness correspondence amount obtained by the rear actual roll stiffness correspondence amount obtaining device, and
wherein the actual roll stiffness distribution ratio base selection portion selects the dependent target roll stiffness determining portion based on the actual roll stiffness distribution ratio obtained by the actual roll stiffness distribution ratio obtaining portion.

6. The suspension system according to claim 4, wherein:
at least one of the front actual roll stiffness correspondence amount obtaining device and the rear actual roll stiffness correspondence amount obtaining device includes an actuator operation amount detecting device; and
the actuator operation amount detecting device obtains, as at least one of the front actual roll stiffness correspondence amount and the rear actual roll stiffness correspondence amount, an operation amount of the actuator of at least one of the front roll stiffness changing device and the rear roll stiffness changing device, which corresponds to the at least one of the front actual roll stiffness correspondence amount obtaining device and the rear actual roll stiffness correspondence amount obtaining device.

7. The suspension system according to claim 4, wherein:
at least one of the front actual roll stiffness correspondence amount obtaining device and the rear actual roll stiffness correspondence amount obtaining device includes a left-wheel load sensor and a right-wheel load sensor, and a wheel load difference obtaining portion;
the left-wheel load sensor and the right-wheel load sensor detect loads on a left wheel and a right wheel, respectively, on at least one of a front side and a rear side that corresponds to the at least one of the front actual roll stiffness correspondence amount obtaining device and the rear actual roll stiffness correspondence amount obtaining device; and
the wheel load difference obtaining portion obtains, as at least one of the front actual roll stiffness correspondence amount and the rear actual roll stiffness correspondence amount, a difference between the loads on the left-wheel and the right wheel which are detected by the left-wheel load sensor and the right-wheel load sensor.

8. The suspension system according to claim 1, wherein:
the roll stiffness distribution control device includes an independent target roll stiffness determining portion and a dependent target roll stiffness determining portion;
the independent target roll stiffness determining portion determines the target roll stiffness correspondence amount of a predetermined one of the front roll stiffness changing device and the rear roll stiffness changing device independently; and
the dependent target roll stiffness determining portion determines the target roll stiffness correspondence amount of a counterpart of the predetermined one of the front roll stiffness changing device and the rear roll stiffness changing device, according to the actual roll stiffness correspondence amount of the predetermined one of the front roll stiffness changing device and the rear roll stiffness changing device.

9. The suspension system according to claim 8, further comprising an actual roll stiffness correspondence amount obtaining device that obtains the actual roll stiffness correspondence amount corresponding to the predetermined one of the front roll stiffness changing device and the rear roll stiffness changing device.

10. The suspension system according to claim 9, wherein the actual roll stiffness correspondence amount obtaining device includes an actuator operation amount detecting device that obtains, as the actual roll stiffness correspondence amount, an operation amount of the actuator of the predetermined one of the front roll stiffness changing device and the rear roll stiffness changing device.

11. The suspension system according to claim 9, wherein:
the actual roll stiffness correspondence amount obtaining device includes a left wheel load sensor and a right-wheel load sensor, and a wheel load difference obtaining portion;
the left-wheel load sensor and the right-wheel load sensor detect loads on a left wheel and a right wheel, respectively, on one of a front side and a rear side that corresponds to the predetermined one of the front actual roll stiffness correspondence amount obtaining device and the rear actual roll stiffness correspondence amount obtaining device; and
the wheel load difference obtaining portion obtains, as the actual roll stiffness correspondence amount, a difference between the loads on the left-wheel and the right wheel which are detected by the left-wheel load sensor and the right-wheel load sensor.

12. The suspension system according to claim 1, further comprising:
a front control device that controls the front roll stiffness changing device; and
a rear control device that controls the rear roll stiffness changing device,
wherein the roll stiffness distribution control device includes an actual roll stiffness correspondence amount supply portion, and
wherein the actual roll stiffness correspondence amount supply portion is provided in at least one of the front control device and the rear control device, and supplies the actual roll stiffness correspondence amount that corresponds to a counterpart of the at least one of the front control device and the rear control device from the counterpart to the at least one of the front control device and the rear control device.

13. The suspension system according to claim 1, wherein the target roll stiffness correspondence amount on the at least one of the front roll stiffness changing device and the rear roll stiffness changing device is lower than the actual roll stiffness correspondence amount.

14. The suspension system according to claim 1, wherein if the actual roll stiffness correspondence amount is less than a first set value, the rear roll stiffness changing device is changed in accordance with the target roll stiffness correspondence amount to reduce the roll stiffness on the rear-wheel side of the vehicle.

15. The suspension system according to claim 14, wherein if the actual roll stiffness correspondence amount is greater than a second set value, the front roll stiffness changing device is changed in accordance with the target roll stiffness correspondence amount to reduce the roll stiffness on the front-wheel side of the vehicle.

* * * * *